Figure 1:
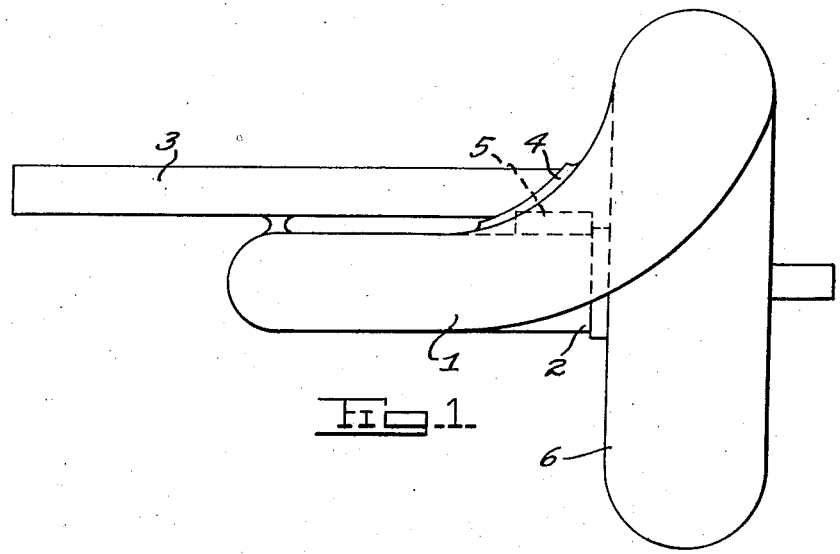

April 12, 1938.　　　　　L. D. GOODHUE　　　2,114,092
MECHANICAL DUSTER
Filed March 9, 1937　　　2 Sheets-Sheet 1

Inventor
L. D. Goodhue
By
Attorney

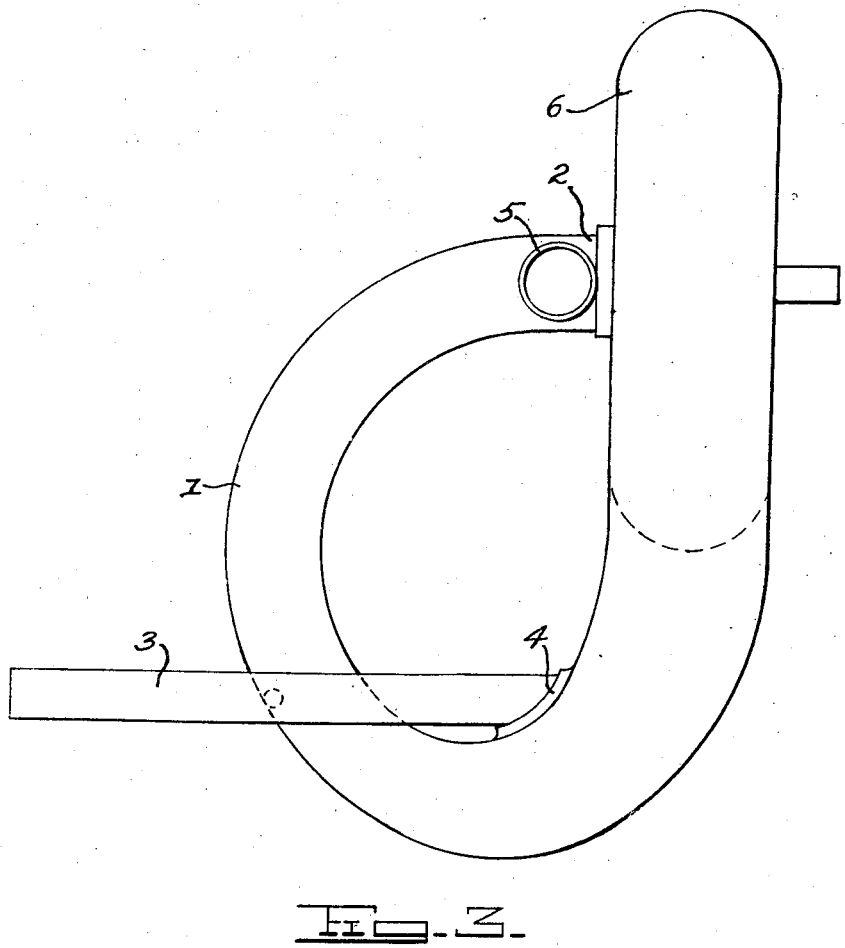

Patented Apr. 12, 1938

2,114,092

UNITED STATES PATENT OFFICE 2,114,092

MECHANICAL DUSTER

Lyle D. Goodhue, Berwyn, Md.; dedicated to the free use of the People of the United States Application March 9, 1937, Serial No. 129,806

1 Claim. (Cl. 43—148)

(Granted under the act of March 3, 1883, as amended April 30, 1928; 370 O. G. 757)

This application is made under the act of March 3, 1883, as amended by the act of April 30, 1928, and the invention described herein, if patented, may be manufactured and used by or for the Government for governmental purposes without the payment to me of any royalty thereon.

I hereby dedicate the invention herein described to the free use of the People of the United States to take effect on the granting of a patent to me.

My invention relates to a new and useful mechanical duster and more particularly to a duster which can be used to disperse finely divided insecticidal materials in the air which after settling on the foliage of plants is intended to give protection against the ravages of insects.

The object of my invention is to provide a mechanical duster that will give a very fine dispersion of almost smoke-like appearance which will penetrate dense foliage and cause a deposit to be formed on the under side of the leaves as well as on the upper side.

Another object of my invention is to provide a mechanical duster that will disintegrate lumps or aggregates that are held together more or less firmly by the cohesion or adhesion of a number of individual particles.

And still another object of my invention is to provide a means of retaining these dust aggregates, lumps or larger particles and returning them to the blower of the machine a number of times until they are sufficiently disintegrated to be expelled in a very finely divided form.

Numerous types of mechanical dusters have been known and used for a long time. My duster is of the continuous type which employs a blower to produce a current of air which serves as a carrier for the material being dusted. However, to the best of my knowledge, no device has been used to separate the large particles and aggregates after they have once passed the blower and return them to the inlet where they will again be carried through and again be subjected to the grinding action of a high speed rotary blower.

My invention centrifugally separates the large particles from the fine particles and returns them to the blower until they are sufficiently disintegrated to be expelled.

The device which accomplishes this separation consists of a curved tube extending from the outlet of the blower to the inlet. A junction of a smaller tube is formed near the outlet of the blower on the inside of the curve of the large tube. An opening is provided in the large tube near the inlet of the blower for the purpose of receiving the dust as it is fed into the machine. The larger and heavier particles follow the longer wall of the large curved tube by virtue of the momentum imparted to them by the blower and induced air currents. The outlet tube, being joined to the shorter wall, is in such a position as to receive only the finer particles of dust which are expelled by the portion of the air stream escaping through this outlet tube.

Figure 2:
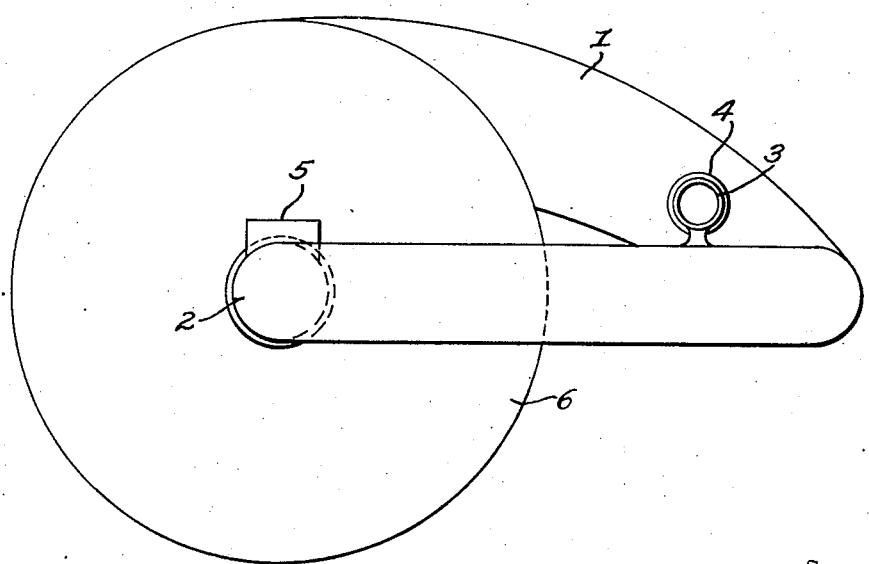

My invention can be more specifically described by referring to the somewhat diagrammatical drawings in which Figure 1 is a side elevation, Figure 2 a front elevation, and Figure 3 a top plan view.

Similar numerals refer to similar parts throughout the several views.

A high speed blower having properly designed rotating blades has an outlet connected to a curved tube 1, which is again attached and forms a part of the inlet 2 to the blower. An outlet tube 3 of smaller diameter forms a junction with the large outlet 4 of the blower which is near the entrance to the circulating tube 1 and on its wall nearest the center of the circle which it describes in passing from the outlet 3 to the inlet 2 of the blower. The opening 5 near the inlet 2 of the blower is an orifice for the reception of the dust being fed into the machine. The housing 6, encloses a rotor (not shown) with properly designed blades (not shown), which is a common essential part of any blower, whether it is used for the dusting of insecticides or for other purposes. A mechanism to feed the dust into the machine is already known and is, therefore, not shown. Likewise, the source of power is not described for the same reason.

By varying the ratio of the diameter of the outlet tube 3 to the circulating tube 1 any desired separation of the large and small particles can be obtained, provided that the angle at which the tube 3 meets the tube 1 is near 90 degrees, and that the diameter of the circulating tube 1 is smaller than that of the main outlet of the blower. Also by varying the radius of curvature of the circulating tube 1 at the junction with the outlet tube 3, the degree of centrifugal separation can be varied. A variation of the speed of the blower will also alter the degree of separation.

The operation of my duster in which the large particles are centrifugally separated from the small ones and returned again and again to the blower may be explained as follows:

During the operation, the blower is run at a speed varying from 5,000 to 15,000 revolutions per minute, depending on the size of the machine, causing a current of air to be forced at a high speed through the circulating tube 1 and at the same time a smaller current of air to be expelled through the outlet tube 3, which causes an equal amount of air to be drawn in the orifice 5. Insecticidal dust is fed to the orifice 5 by a suitable mechanism (not shown) from where it is drawn into the blower by the current of air circulating in the tube 1, agitated violently and expelled into tube 1 and tube 3. The large particles are thrown against the larger circumference of tube 1 by their momentum while the finer particles, which according to Stokes' law require a much greater force to cause them to settle at the same rate as the large particles, remain suspended and are in part expelled through the outlet tube 3. The large particles are again returned to the blower by way of the circulating tube 1 where they are mixed with the incoming dust. The large particles are thus returned again and again until they are disintegrated and expelled through the outlet tube 3.

My duster is especially adapted for dusting greenhouses, mushroom houses or other enclosed spaces where it is desirable to obtain a very fine smoke-like dispersion of an insecticidal dust. Tests have been made by blowing lime, clay and other materials into a closed room. A suspension can be produced, a considerable portion of which will remain suspended from 30 to 60 minutes and which leaves an evenly distributed coating on all sides of objects placed in the room.

Having thus described my invention, what I claim for Letters Patent is:

A continuous blower type duster for insecticidal materials, a blower housing having a curved connecting tube from the outlet to the inlet thereof; a smaller outlet tube adapted to be joined to the wall of the connecting tube nearest the center of the curve described by said connecting tube and near the main outlet of the housing; and an orifice in the connecting tube near the inlet of the housing for the reception of dust.

LYLE D. GOODHUE.